US007357334B2

(12) United States Patent
Matsuura et al.

(10) Patent No.: US 7,357,334 B2
(45) Date of Patent: Apr. 15, 2008

(54) METHOD AND APPARATUS FOR SEPARATING A SOLUTION

(75) Inventors: Kazuo Matsuura, Naruto (JP); Tetsuo Fukazu, Naruto (JP); Taisuke Sekimoto, Chiba (JP)

(73) Assignee: Ultrasound Brewery, Tokushima (JP)

( * ) Notice: Subject to any disclaimer, the term of this patent is extended or adjusted under 35 U.S.C. 154(b) by 421 days.

(21) Appl. No.: 11/091,486

(22) Filed: Mar. 29, 2005

(65) Prior Publication Data

US 2005/0218241 A1 Oct. 6, 2005

(30) Foreign Application Priority Data

Mar. 30, 2004 (JP) ............................ 2004-097781

(51) Int. Cl.

*A24F 25/00* (2006.01)
*B05B 17/00* (2006.01)
*B05B 1/08* (2006.01)
*B05B 1/00* (2006.01)

(52) U.S. Cl. ............................ 239/34; 239/1; 239/596; 239/589.1; 239/132.3; 239/102.1

(58) Field of Classification Search ................ 239/596, 239/1, 124, 104, 125, 132.3, 102.1, 102.2, 239/589, 589.1, 34, 4, 120, 128; 95/96, 131; 96/53, 57, 200, 201

See application file for complete search history.

(56) References Cited

U.S. PATENT DOCUMENTS 5,759,394 A * 6/1998 Rohrbach et al. ........... 210/264
6,235,088 B1 5/2001 Matsuura
6,402,046 B1 * 6/2002 Loser ............................ 239/4
6,517,612 B1 * 2/2003 Crouch et al. ................ 95/277

FOREIGN PATENT DOCUMENTS

| | | |
|---|---|---|
| EP | 0 298 288 | 1/1989 |
| EP | 0 511 687 | 11/1992 |
| FR | 2 857 881 | 1/2005 |
| GB | 2 404 880 | 2/2005 |
| JP | 9-187601 | 7/1997 |
| JP | 2001-314724 | 11/2001 |

* cited by examiner

*Primary Examiner*—Davis D. Hwu
(74) *Attorney, Agent, or Firm*—Wenderoth, Lind & Ponack, L.L.P.

(57) ABSTRACT

In a method and apparatus for separating a solution, the solution containing a target substance is atomized into a mist in an atomizer (1) to produce a mixed fluid of mist and air. In the collection of the mist from this mixed fluid, an air transmission membrane (51) is used, and the air transmission membrane has a pore size that transmits air but does not transmit the target substance contained in the mist. The mixed fluid is brought into contact with the primary surface of the air transmission membrane (51), and the pressure on the primary surface is made higher than the pressure on the secondary surface of the opposite side. Thereby, the air in the mixed fluid is allowed to pass through the air transmission membrane (51) to separate part or all of the air contained in the mixed fluid.

23 Claims, 14 Drawing Sheets

51 • • AIR TRANSMISSION MEMBRANE

54 • • FORCED AIR DISCHARGER

METHOD AND APPARATUS FOR SEPARATING A SOLUTION

BACKGROUND OF THE INVENTION

1. Field of the Invention

The present invention relates to a method and an apparatus for separating a solution that separate a higher concentration of alcohol mainly from an alcohol solution such as sake (Japanese rice wine) or sake raw materials.

2. Description of the Related Art

The inventor of the present invention has developed an apparatus for separating alcohol which is a target material exhibiting a physical property of surface excess (See Japanese Patent Application Laid-open No. 2001-314724).

With this type of separating apparatus, an ultrasonic atomization chamber with a closed structure is filled with an alcohol solution, and the alcohol solution in the ultrasonic atomization chamber is atomized into a mist by means of ultrasonic oscillation with an ultrasonic oscillator. The separating apparatus aggregates and collects the atomized mist, and separates a higher concentration of alcohol solution. More specially, the separating apparatus separates a higher concentration of alcohol solution as a target material as follows.

With an alcohol, which quickly moves to the surface and exhibits a physical property of surface excess, the concentration of alcohol is high at its surface. When the solution is oscillated in this state by ultrasonic oscillation, fine liquid droplets are ejected into air as a mist from the surface of the solution by ultrasonic oscillation energy. The mist ejected into air has a higher concentration of alcohol. The reason is that the solution at its surface with a higher concentration of alcohol is ejected as the mist. Therefore, a solution with a higher concentration of alcohol can be separated by aggregating and collecting the mist. With this method, a high concentration of alcohol solution can be separated without heating the solution. Thus, a target material can be separated at a high concentration. Furthermore, since heating is not necessary, the separating apparatus has an advantage in that the target material can be separated without deterioration of the quality.

SUMMARY OF THE INVENTION

With the above-described apparatus, the solution is atomized as a mist into circulated air. The reason why air is circulated is that the mist contained in air and the target material vaporized from the mist cannot be completely collected. Namely, when air containing an uncollectable portion of the target material is discharged to the outside, the target material will disappear to increase the loss, so that the air is circulated into the ultrasonic atomization chamber without discharging the air to the outside. For this reason, the ultrasonic atomization chamber is not supplied with fresh air, and air containing the target material is circulated Meanwhile, when a solution is to be atomized into a mist having a high concentration, the efficiency in producing a mist of the target material decreases if the air contains the target material. In atomizing the target material into a mist, the mist of the target material can be produced efficiently by increasing the degree of non equilibrium between the solution surface and the gas phase side. However, when the air in the ultrasonic atomization chamber contains a high concentration of alcohol, the alcohol will be in a near equilibrium state between the solution surface and the gas phase side, so that the mist of alcohol cannot be produced with a good efficiency.

The reason why the air from which the target material such as alcohol has been collected is circulated into the ultrasonic atomization chamber is that the air contains the target material. Therefore, the air circulated into the ultrasonic atomization chamber contains the target material such as alcohol, and this aggravates the efficiency of atomizing the target material into a mist. This problem can be solved by completely collecting the target material before circulating the air into the ultrasonic atomization chamber. However, in actual cases, the target material contained in air cannot be completely collected, so that the target material contained in the circulated air aggravates the efficiency in producing a mist.

Also, with a conventional apparatus, the air is cooled for aggregating and collecting the mist. For this reason, the cooled air is circulated into the ultrasonic atomization chamber. However, in atomizing the solution into a mist in the ultrasonic atomization chamber, the efficiency of producing a mist decreases when the temperature of the solution is low. This problem can be solved by heating the solution. However, heating the solution requires heat energy. This increases the total energy consumption, and increases the energy consumption for concentrating the solution.

Further, with a conventional apparatus, the air is cooled for aggregating the mist, and this increases energy consumption. In particular, since the air serving as a carrier gas for carrying the mist is cooled for aggregating the mist, the amount of air to be cooled increases when the concentration of the mist contained in the air decreases, and a large amount of energy is consumed for cooling the air. In order to produce a mist in the ultrasonic atomization chamber with a good efficiency, the concentration of the mist relative to the air must be lowered as described before. However, when the concentration of the mist relative to the air decreases, the energy for cooling the air increases. When the amount of mist relative to air is increased in order to avoid this drawback, the mist cannot be produced at a high efficiency in the ultrasonic atomization chamber.

The present invention has been developed in order to solve the aforementioned problems of the conventional art. An important object of the present invention is to provide a method and an apparatus for separating a solution in which the solution can be S efficiently separated with reduced energy consumption for cooling and the like by efficiently collecting the mist while efficiently producing the mist.

A method of separating a solution according to the first aspect of the present invention includes an atomization step of atomizing a solution containing a target substance into a mist in an atomizer 1 to produce a mixed fluid of mist and air, and a collection step of collecting the mist from the mixed fluid obtained in the atomization step. With this separation method, in the collection step, an air transmission membrane 51 of a pore size is used that transmits air but does not transmit the target substance contained in the mist. With this separation method, the mixed fluid is brought into contact with a primary surf ace of the air transmission membrane 51, and a pressure on the primary surface is made higher than a pressure on a secondary surface of an opposite side, whereby the air in the mixed fluid is let to pass through the air transmission membrane 51 to separate part or all of the air contained in the mixed fluid.

The atomizer 1 can atomize the solution into the mist by ultrasonic oscillation. The atomizer 1 can atomize the solution into the mist by ultrasonic oscillation at a frequency of 1 MHz or higher.

With a method of separating a solution according to the second aspect of the present invention, in the collection step, the mixed fluid from which part of the air has been separated by the air transmission membrane 51 can be further cooled to aggregate and collect the mist. Further, with this separation method, the mixed fluid, from which the mist has been separated by cooling and aggregation after part of the air is separated by the air transmission membrane 51, can be circulated and supplied to the atomizer 1. Furthermore, with the separation method of the present invention, the air separated from the mixed fluid by the air transmission membrane 51 can be supplied to the atomizer 1.

An apparatus for separating a solution according to the first aspect of the present invention includes an atomization chamber 4 to which a solution containing a target substance is supplied, an atomizer 1 for scattering the solution in the atomization chamber 4 into air as a mist to produce a mixed fluid of air and the mist in the solution, and an air separator 50 connected to the atomization chamber 4 to separate air from the mixed fluid. An inside of the air separator 50 is partitioned by an air transmission membrane 51 of a pore size that transmits air but does not transmit the target substance, so as to provide, in an inside thereof, a primary passageway 52 for passing the mixed fluid and a secondary air-discharging passageway 53 for discharging air. A forced air discharger 54 is connected to the secondary air-discharging passageway 53 of the air separator 50. With this separation apparatus, the forced air discharger 54 discharges the air in the secondary air-discharging passageway 53 in a forced manner to make a pressure on a primary surface of the air transmission membrane 51 higher than a pressure on a secondary surface of the air transmission membrane 51 so that the air contained in the mixed fluid may be transmitted through the air transmission membrane 51 to separate air from the mixed fluid that passes through the primary passageway 52.

An apparatus for separating a solution according to the second aspect of the present invention includes an atomization chamber 4 to which a solution containing a target substance is supplied, an atomizer 1 for scattering the solution in the atomization chamber 4 into air as a mist to produce a mixed fluid of air and the mist in the solution, and an air separator 50 connected to the atomization chamber 4 to separate air from the mixed fluid. An inside of the air separator 50 is partitioned by an air transmission membrane 51 of a pore size that transmits air but does not transmit the target substance, so as to provide, in an inside thereof, a primary passageway 52 for passing the mixed fluid and a secondary air-discharging passageway 53 for discharging air. A compressor 55 for pressurizing and supplying the mixed fluid in the atomization chamber 4 is connected to the primary passageway 52 of the air separator 50. With this separation apparatus, the compressor 55 presses the mixed fluid in the atomization chamber 4 into the primary passageway 52 to make a pressure on a primary surface of the air transmission membrane 51 higher than a pressure on a secondary surface of the air transmission membrane 51 so that the air contained in the mixed fluid may be transmitted through the air transmission membrane 51 to separate air from the mixed fluid that passes through the primary passageway 52.

The separation method and the separation apparatus described above have an advantage in that the solution can be efficiently separated with reduced energy consumption for cooling and the like by efficiently collecting the mist while efficiently producing the mist. The reason is that, with the separation method and the separation apparatus described above, the mixed fluid of air and the mist of the solution containing the target substance produced by the atomizer is brought into contact with a primary surface of an air transmission membrane of a pore size that transmits air but does not transmit the target substance contained in the mist, and a pressure on the primary surface is made higher than a pressure on a secondary surface of an opposite side, whereby the air in the mixed fluid is let to pass through the air transmission membrane to separate the air contained in the mixed fluid. The mixed fluid from which air has been separated has a small content of air, and contains the target substance in a supersaturated state, so that a high concentration of the target substance can be collected with an extremely good efficiency.

The air transmission membrane 51 can include a filter member obtained by coating a surface of a ceramic with zeolite. The atomizer 1 can include an ultrasonic oscillator 2 for atomizing the solution into a mist by ultrasonic oscillation and an ultrasonic power supply 3 connected to the ultrasonic oscillator 2 to supply high-frequency electric power to the ultrasonic oscillator 2 for ultrasonic oscillation.

With the separation apparatus of the present invention, the mist can be collected by connecting any one of a cyclone, a punched plate, a demistor, a chevron, a scrubber, a spray tower, and an electrostatic collector to an outlet side or an inlet side of the air separator 50.

With the separation apparatus of the present invention, a collection chamber 5 for aggregating and collecting the mist from the mixed fluid can be connected to an outlet side of the primary passageway 52 provided in the air separator 50. In addition, with the separation apparatus of the present invention, a cooling heat exchanger 33 can be provided in the collection chamber 5, and the mist can be aggregated and collected by cooling the mixed fluid with the cooling heat exchanger 33.

With the separation apparatus of the present invention, a collection chamber 5 can be connected to the atomization chamber 4, whereby the air from which air has been separated by the air separator 50 and further the mist has been separated in the collection chamber 5 can be supplied to the atomization chamber 4. In addition, with the separation apparatus of the present invention, the secondary air-discharging passageway 53 of the air separator 50 can be connected to the atomization chamber 4, whereby the air separated from the mixed fluid by the air transmission membrane 51 of the air separator 50 can be supplied to the atomization chamber 4.

Further, with the separation method and the separation apparatus that aggregate and collect the mist by cooling the mixed fluid from which part of air has been separated by the air transmission membrane, the target substance can be efficiently collected with reduced amount of energy consumption for cooling. The reason is that the mixed fluid from which air has been separated by the air transmission membrane has a reduced amount of air, so that, when cooling, the target substance can be collected efficiently with reduced amount of cooling.

Furthermore, with the separation method and the separation apparatus that circulate into the atomization chamber the mixed fluid from which the mist has been separated by being cooled and aggregated after part of the air is separated by the air transmission membrane, the mist can be efficiently produced while reducing the energy consumption. The reason is that, since the mixed fluid with reduced amount of cooling is circulated into the atomization chamber, the solution can be atomized into a mist while reducing the energy consumption for heating the solution in the atomization chamber.

Further, the separation method and apparatus in which the air separated from the mixed fluid by the air transmission membrane is supplied to the atomization chamber has an advantage in that the solution can be efficiently atomized into a mist in the atomization chamber. The reason is that the air separated from the mixed fluid does not contain the target substance. Also, since the air separated from the mixed fluid by the air transmission membrane is air controlled to have an optimum temperature for producing the mist in the atomization chamber, the mist can be efficiently produced by supplying this air into the atomization chamber.

The above and further objects and features of the invention will more fully be apparent from the following detailed description with accompanying drawings.

DETAILED DESCRIPTION OF THE PREFERRED EMBODIMENTS

Figure 1:
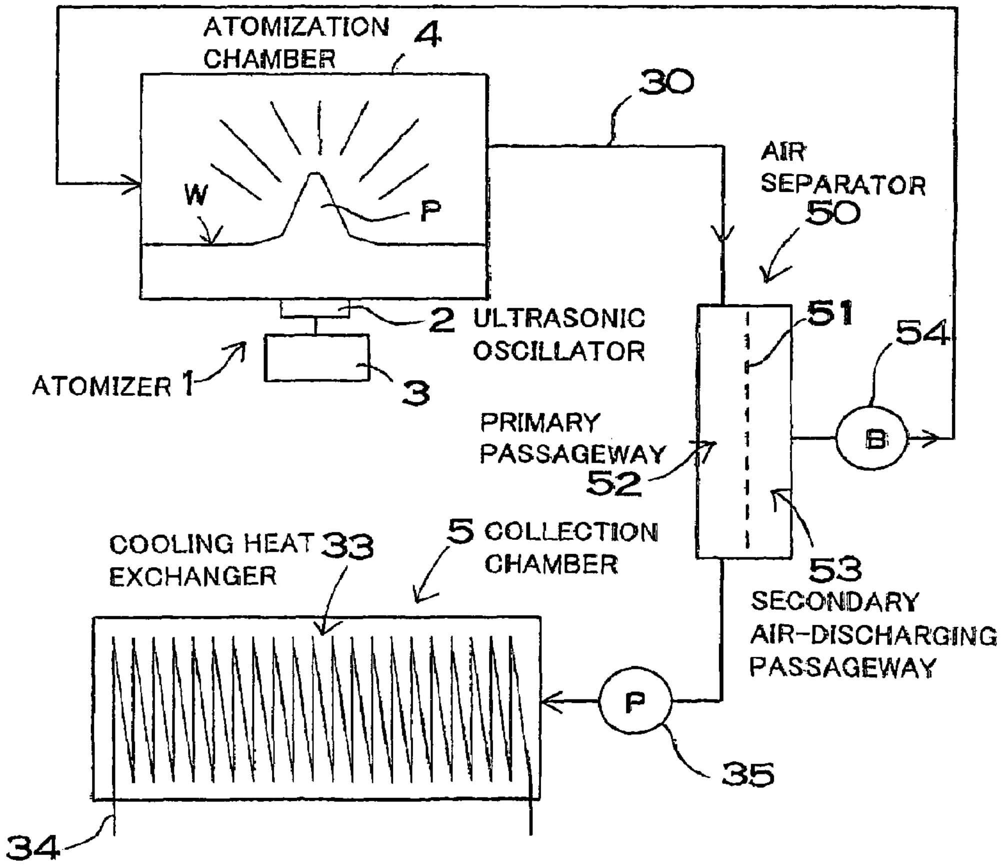
FIG. 1 is a diagram schematically showing an apparatus for concentrating a solution according to one embodiment of the present invention.

An apparatus for separating a solution according to the present invention atomizes a solution containing a target material, which quickly moves to the liquid surface and exhibits a physical property of surface excess, into a mist and then separates the solution by collecting the mist. In the present invention, solutes and solvents of the solution are not specifically limited. Though water is mainly used as a solvent in the present invention, organic solvents such as an alcohol can be used other than water. Following solutions containing target materials can be used, for example.

(1) Refined sake, beer, wine, vinegar, mirin (sweet sake for cooking), spirits, shochu (Japanese spirits), brandy, whisky and liqueur.

(2) Solutions containing a perfume such as pinene, linalool, limonene, or polyphenols, an aromatic component, or a fragrant component.

(3) Solutions containing an organic compound that is classified as any one of alkane and cycloalkane, which are a saturated hydrocarbon, alkene, cycloalkene, and alkyne, which are an unsaturated hydrocarbon, ether, thioether, and aromatic hydrocarbon, or a compound obtained by bonding these.

(4) Solution containing a substance obtained by substituting a halogen(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(5) Solution containing a substance obtained by substituting a hydroxy group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(6) Solution containing a substance obtained by substituting an amino group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(7) Solution containing a substance obtained by substituting a carbonyl group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(8) Solution containing a substance obtained by substituting a carboxyl group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these (9) Solution containing a substance obtained by substituting a nitro group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(10) Solution containing a substance obtained by substituting a cyano group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(11) Solution containing a substance obtained by substituting a mercapto group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(12) Solutions containing a substance obtained by substituting a metal ion(s) for at least one atom of the target substances mentioned in (3) to (11).

(13) Solutions containing a substance obtained by substituting an arbitrary molecule(s) of the molecules mentioned in (3) to (11) for an arbitrary hydrogen atom(s), carbon atom(s), or functional group (s) contained In the target substances mentioned in (3) to (11).

The target materials contained in the above solutions quickly move to the surface and exhibit a physical property of surface excess. The concentrations of these target material are high at the surface. When the solutions at the surface are atomized into a mist, the mist has a higher concentration of the target materials. Therefore, aggregating and collecting the mist can make the concentration of the target materials higher. That is, a compound containing a higher concentration of the target material can be separated from the solution. Though the atomizer for atomizing the solution at the surface into a mist is not specifically limited, the atomizer that can be used may be one that oscillates the solution at an ultrasonic frequency, one that discharges the solution from a capillary and electrostatically atomizes the solution at the electrode, or the like.

The following description will describe an apparatus and a method for separating a higher concentration of alcohol from a solution containing the alcohol as a target material by producing a mist through ultrasonic oscillation. However, in the present invention, the target material is not limited to an alcohol. Any target material, which quickly moves to the surface and exhibits a physical property of surface excess, can be separated. Also, the atomizer that atomizes a solution into a mist is not limited to an atomizer by ultrasonic oscillation. For example, an electrostatic atomizer or the like can be used.

The separation apparatus shown in FIGS. 1 to 4 includes an atomization chamber 4, 204, 304, 404 having a closed structure to which a solution is supplied, an atomizer 1, 201, 301, 401 for atomizing the solution in the atomization chamber 4, 204, 304, 404 into a mist, an air separator 50, 2050, 3050, 4050 for separating air from a mixed fluid of air and the mist atomized in the atomization chamber 4, 204, 304, 404, a collection chamber 5, 205, 305, 405 for further aggregating and collecting the mixed fluid from which part of the air has been separated by the air separator 50, 2050, 3050, 4050, and a forced transporter 35, 2035, 3035, 4035 for transporting the mixed fluid.

The solution is supplied to the atomization chamber 404 by a pump 4010. The atomization chamber 4, 204, 304, 404 does not atomize all the solution supplied thereto as a mist. The reason is that, if all the solution is atomized and collected in the collection chamber 5, 205, 305, 405, the concentration of a target material such as alcohol in the solution collected in the collection chamber 5, 205, 305, 405 will be the same as that of the solution supplied to the atomization chamber 4, 204, 304, 404. With the solution supplied to the atomization chamber 4, 204, 304, 404, the concentration of the target material decreases as the amount of the solution decreases due to the atomization into a mist. Therefore, the concentration of the target material contained in the mist also gradually decreases. The solution in the atomization chamber 4, 204, 304, 404 is replaced with a new solution when the concentration of the target material decreases.

A solution containing the target material, for example, at a concentration of 10 to 50% by weight is atomized in the atomization chamber 4, 204, 304, 404. When the concentration of the target material decreases, the solution in the atomization chamber 4, 204, 304, 404 is replaced with a new solution. The solution is replaced in a batch manner, i.e. by a method in which the solution is replaced with a new one each time after a predetermined period of time passes. However, a stock solution tank 4011 storing a solution may be connected to the atomization chamber 404 via a pump 4010, whereby the solution can be supplied continuously from the stock solution tank 4011. With this apparatus, the atomization chamber 404 is supplied with a solution from the stock solution tank 4011 while discharging the solution in the atomization chamber 404, thus preventing decrease in the concentration of the target material such as alcohol in the solution in the atomization chamber 404. Also, as shown by an arrow B in FIG. 4, the solution in the atomization chamber 404 can be discharged to the outside without being circulated into the stock solution tank 4011, so as to prevent decrease in the concentration of the target material contained in the stock solution tank 4011.

The solution in the atomization chamber 4, 204, 304, 404 is atomized into a mist by the atomizer 1, 201, 301, 401. The mist produced by the atomizer 1, 201, 301, 401 has a higher concentration of the target material than the solution. In this case, the atomizer 1, 201, 301, 401 produces a mist from the solution by atomization, and the mist is aggregated and collected, whereby a highly concentrated solution can be efficiently separated.

The atomizer 1, 201, 301, 401 includes a plurality of ultrasonic oscillators 2, 202, 302, 402 and an ultrasonic power supply 3,203, 303, 403 that supplies high-frequency electric power to these ultrasonic oscillators 2, 202, 302, 402. The atomizer 1, 201, 301, 401 preferably atomizes the solution by ultrasonic oscillation at a frequency of 1 MHz or higher. Use of this atomizer 1, 201, 301, 401 has an advantage in that the solution can be atomized into a mist made of extremely fine droplets, and can concentrate the solution at a higher concentration. In the present invention, the atomizer is not limited to the one by ultrasonic oscillation; however, with an atomizer by ultrasonic oscillation, the oscillation frequency can be made lower than 1 MHz.

Figure 5:
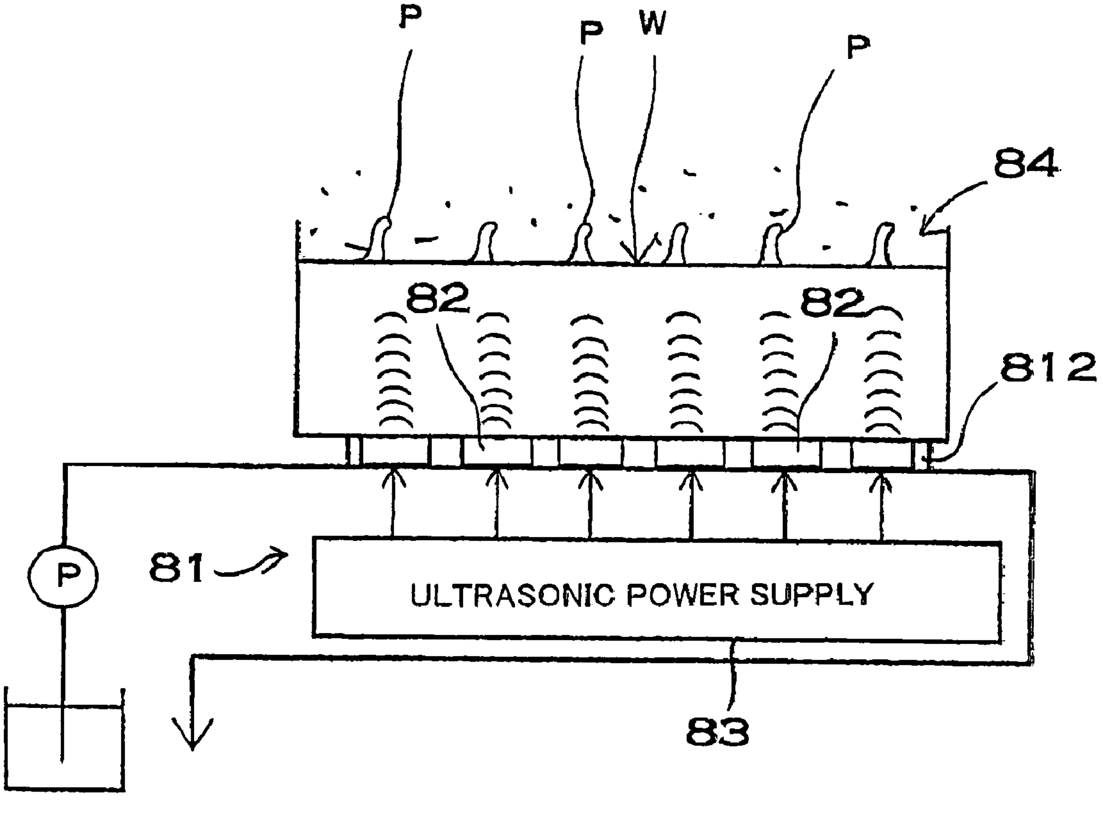
FIG. 5 is a cross-sectional view schematically showing one example of an ultrasonic atomization chamber and an ultrasonic atomizer.

The atomizer 1, 201, 301, 401 that oscillates the solution at an ultrasonic frequency scatters the solution from the solution surface W as a mist with a concentration higher than the solution in the atomization chamber 4, 204, 304, 404. When the solution is subjected to ultrasonic oscillation, liquid columns P appear on the solution surface W. The mist is produced from the surface of the liquid columns P. With the atomizer 81 shown in FIG. 5, ultrasonic oscillators 82 of the atomizer 81 are arranged to face upwards on the bottom of the atomization chamber 84 filled with the solution, The ultrasonic oscillators 82 emit ultrasonic waves upward from the bottom toward the solution surface W, and subject the solution surface W to ultrasonic oscillation to produce liquid columns P. The ultrasonic oscillators 82 emit ultrasome waves in the vertical direction.

The atomizer 81 shown in the drawings includes a plurality of ultrasonic oscillators 82 and an ultrasonic power supply 83 that oscillates these ultrasonic oscillators 82 at an ultrasonic frequency. The ultrasonic oscillators 82 are fixed, in a watertight structure, to the bottom of the atomization chamber 84. The apparatus, which oscillates the solution at an ultrasonic frequency by means of the plurality of ultrasonic oscillators 82, produces a mist from the solution more efficiently.

Figure 6:
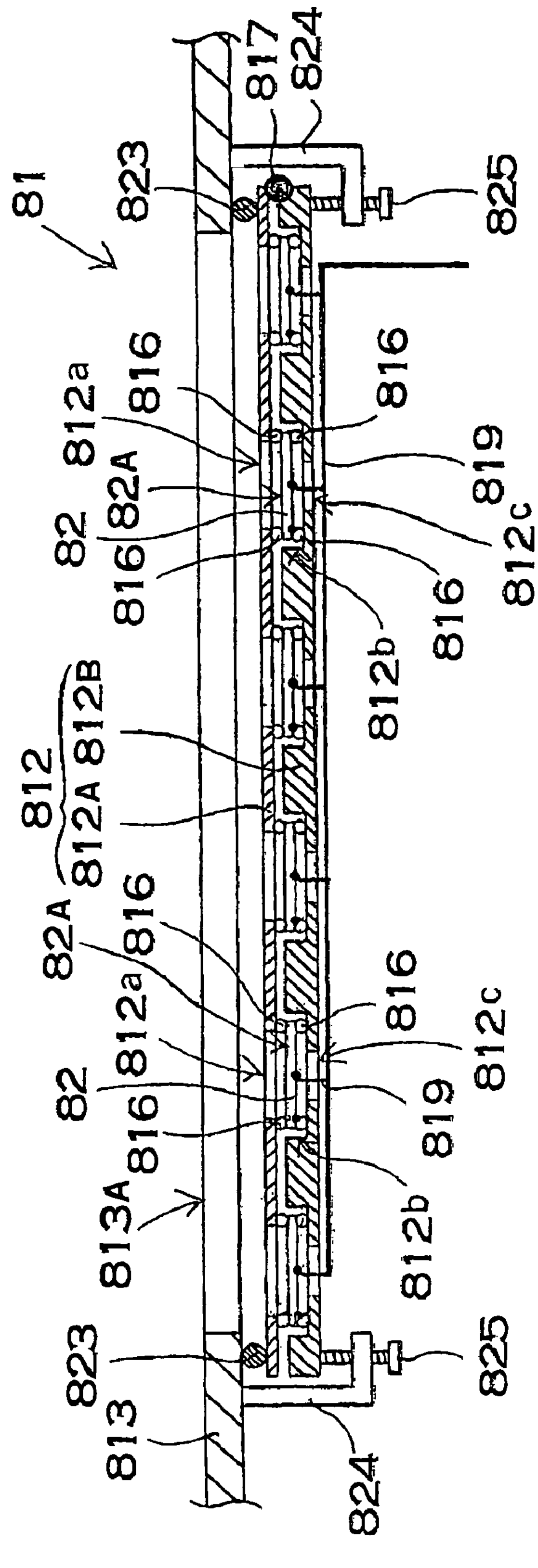
FIG. 6 is an enlarged cross-sectional view showing one example of a connection structure between an ultrasonic oscillator and a detachable plate.
Figure 7:
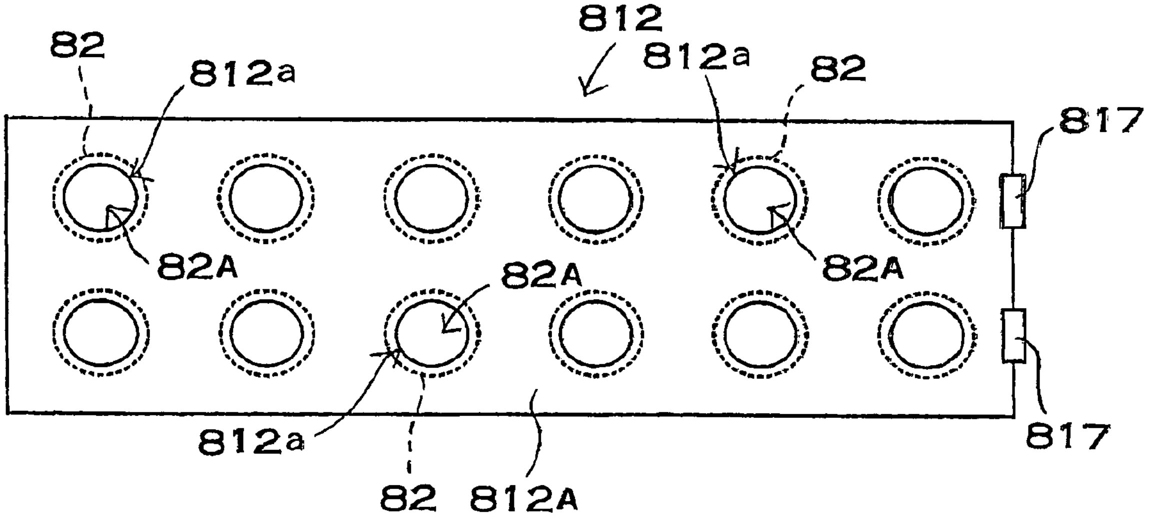
FIG. 7 is a plan view of the detachable plate shown in FIG. 6.
Figure 8:
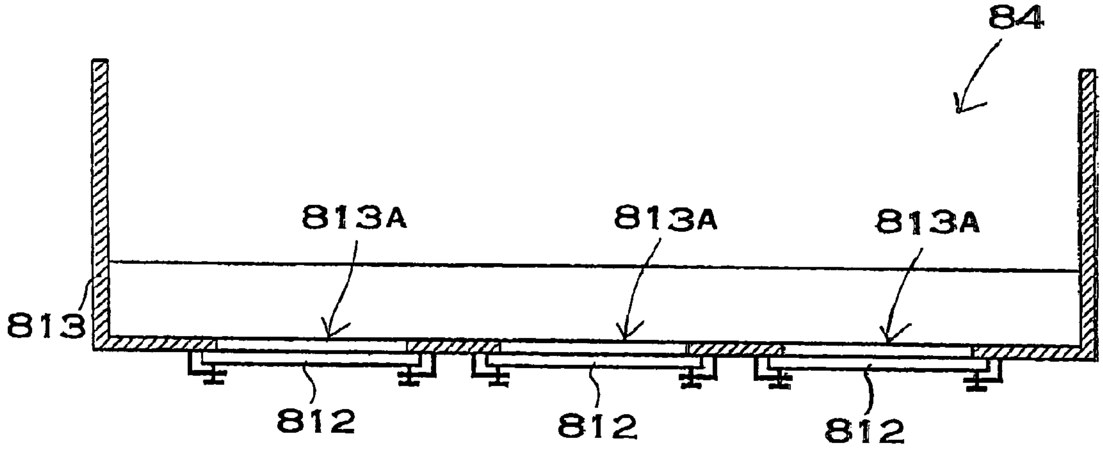
FIG. 8 is a cross-sectional view showing a state in which the detachable plate is attached to the ultrasonic atomization chamber.
Figure 9:
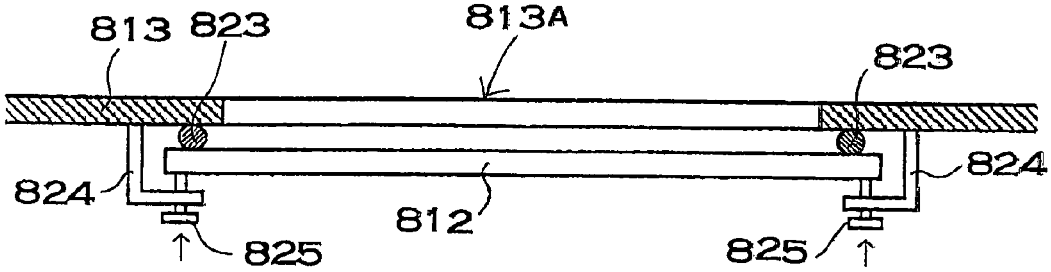
FIG. 9 is an enlarged cross-sectional view showing a connection structure between the detachable plate and the ultrasonic atomization chamber shown in FIG. 8.

The plurality of ultrasonic oscillators 82 are fixed to a detachable plate 812 in a watertight structure, as shown in FIGS. 6 and 7. The detachable plate 812, on which the plurality of ultrasonic oscillators 82 are fixed, is attached to a casing 813 of the atomization chamber 84 to be capable of being attached and detached in a watertight structure, as shown in FIGS. 8 and 9. The detachable plate 812 is attached to the casing 813 of the atomization chamber 84, thus, each ultrasonic oscillator 82 oscillates the solution in the atomization chamber 84 at an ultrasonic frequency.

The detachable plate 812 shown in FIGS. 6 and 7 includes a front side plate 812A and a backside plate 812B. The front side plate 812A and the backside plate 812B are laminated to sandwich the ultrasonic oscillators 82 between the front side plate 812A and the backside plate 812B in a watertight structure. The front side plate 812A is provided with through holes 812*a* opening thereon. The front side plate 812A and the backside plate 812B sandwich and fix the ultrasonic oscillators 82 so that oscillation surf aces 82A are positioned in the through holes 812*a*. The backside plate 812B is provided with recessed portions 812*b* in which the ultrasonic oscillators 82 are fitted. With the detachable plate 812 of FIG. 6, the recessed portions 812*b* are provided in the backside plate 812B; however, the recessed portions may be provided in the front side plate to fit the ultrasonic oscillators in the recessed portions. Here, in FIG. 6, reference numeral 812*c* represents through holes, and reference numeral 819 represents a lead wire.

In order to provide a watertight structure between the ultrasonic oscillators 82 and the front side plate 812A, a packing member 816 is sandwiched between the ultrasonic oscillators 82 and the front side plate 812A. With the atomizer 81 shown in FIG. 6, another packing member 816 is also sandwiched between the ultrasonic oscillators 82 and the backside plate 812B in order to provide a watertight structure. However, with the atomizer, the watertight structure need not always be provided between the ultrasonic oscillators and the back side plate. The reason is that, when a detachable plate provides a watertight structure between the ultrasonic oscillators and the front side plate, fixing the detachable plate on the lower surface of the casing of the atomization chamber can prevent leakage of the solution in the atomization chamber. The packing member 816 is an O-ring made of elastic rubber. The packing member 816 of the O-ring is disposed on the outer periphery of the oscillation surface 82A of the ultrasonic oscillators 82 and a surface of the front side plate 812A opposed thereto. The packing member 816 provides a watertight structure between the oscillation surface 82A of the ultrasonic oscillators 82 and the front side plate 812A, thereby preventing leakage of water from there. Additionally, the outer periphery of the ultrasonic oscillators 82 and the backside plate 812B are connected in a watertight structure.

The packing member 816 is an elastic rubber made of Teflon (registered trademark), silicone, natural or synthetic rubber, or the like. The packing members 816 are sandwiched between the ultrasonic oscillators 82 and the front side plate 812A and between the ultrasonic oscillators 82 and the backside plate 812B so as to be elastically deformed and crushed. Thus, the packing members 816 come into close contact with the surfaces of the ultrasonic oscillators 82, the front side plate 812A, and the backside plate 812B without a gap so as to provide a watertight structure in the connection portions. Here, the packing member 816 may be a ring-shaped metal packing member made of a metal such as copper, brass, aluminum, or stainless steel.

With the detachable plate 812 shown in FIGS. 6 and 7, the front side plate 812A and the backside plate 812B are connected to each other by a hinge 817 at one end of each plate. The front side plate 812A and the backside plate 812B of the detachable plate 812 can be opened to attach and detach the ultrasonic oscillators 82 easily. When the ultrasonic oscillators 82 are to be replaced, the front side plate 812A and the backside plate 812B are opened. In this state, the old ultrasonic oscillators are removed, and then new ultrasonic oscillators 82 and packing members 816 are put into predetermined positions. Subsequently, the front side plate 812A and the backside plate 812B are closed, thus, replacement of ultrasonic oscillators 82 is achieved. In addition, the closed backside plate 812B and front side plate 812A are connected at an end of each plate opposite to the hinge 817 with a fastening screw (not shown), or alternatively connected by being fastened to the casing 813 of the atomization chamber 84.

Figure 10:
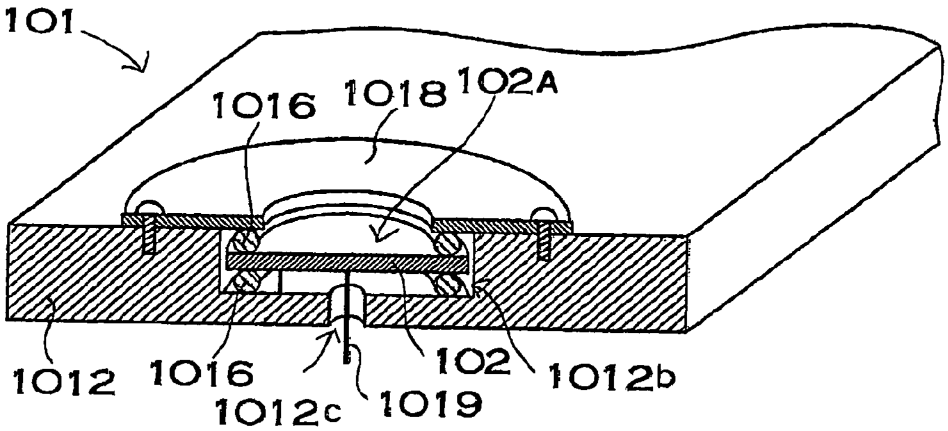
FIG. 10 is an enlarged cross-sectional perspective view showing another example of a connection structure between the ultrasonic oscillator and the detachable plate.
Figure 11:
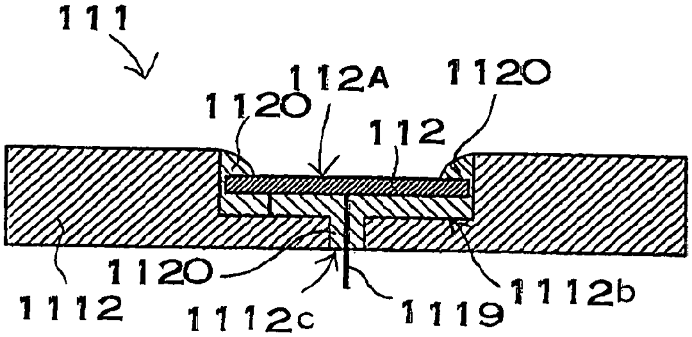
FIG. 11 is an enlarged cross-sectional view showing another example of a connection structure between the ultrasonic oscillator and the detachable plate.
Figure 12:
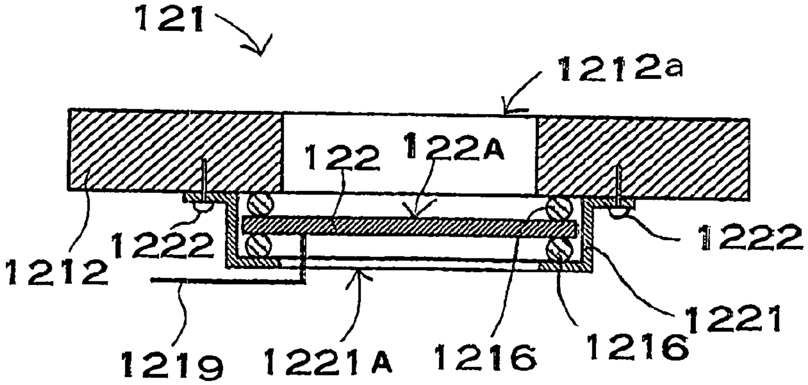
FIG. 12 is an enlarged cross-sectional view showing another example of a connect ion structure between the ultrasonic oscillator and the detachable plate.

The above atomizer 81 provides a watertight structure by means of the packing member 816; however, the atomizer may provide a watertight structure by filling the positions corresponding to the packing member with a caulking material. Furthermore, with the atomizer 81 shown in FIG. 6, the detachable plate 812 is composed of two metal plates or hard non-metal plates of the front side plate 812A and the backside plate 812B; however, the detachable plate 812 may be composed of one plate as shown in FIGS. 10 to 12. The detachable plates 1012, 1112, and 1212 are metal plates or hard non-metal plates. The detachable plates 1012, 1112, and 1212 are provided with recessed portions 1012*b*, 1112*b* thereon or provided with opened through holes 1212*a* for disposing ultrasonic oscillators 102, 112, 122.

With the atomizer 101 of FIG. 10, the ultrasonic oscillator 102 is disposed in the recessed portion 1012*b* of the detachable plate 1012, and packing members 1016 are arranged on the upper and lower peripheries of the ultrasonic oscillator 102. Furthermore, a ring plate 1018 is fixed to an opening of the detachable plate 1012. The ring plate 1018 presses the packing member 1016 disposed on the upper surface of the ultrasonic oscillator 102, thus the ultrasonic oscillator 102 is fixed in the recessed portion 1012*b* in a water tight structure. The recessed portion 1012*b* is provided with a through hole 1012*c* on its bottom. A lead wire 1019 extends outward through the through hole 1012*c*. Here, in FIG. 10, reference numeral 1012A represents an oscillation surface.

With the atomizer 111 of FIG. 11, the ultrasonic oscillator 112, wich is put into the recessed portion 1112*b* of the detachable plate 1112, is bonded with a caulking material 1120 and fixed to form a watertight structure without using the packing member and the ring plate. With this ultrasonic oscillator 112, a lead wire 1119 extends outward through a penetrating through hole 1112*c* that is open at the bottom of the recessed portion 1112*b*. The through hole 1112*c*, through which the lead wire 1119 passes, is filled with the caulking material 1120, thus providing a watertight structure tat prevents leakage of water. Here, in FIG. 11, reference numeral 112A represents an oscillation surface.

With the atomizer 121 of FIG. 12, the detachable plate 1212 is provided with a penetrating through hole 1212*a*. The ultrasonic oscillator 122 is fixed to the lower surface of the detachable plate 1212 so that an oscillation surface 122A is positioned under the through hole 1212*a*. In order to fix the ultrasonic oscillator 122 to the detachable plate 1212, a fixing member 1221 is fixed to the bottom surface of the detachable plate 1212. The ultrasonic oscillator 122 is fixed, in a watertight structure, to the detachable plate 1212 via packing members 1216 arranged on the upper and lower peripheries of the ultrasonic oscillator 122. The fixing member 1221 is a stepped annular member, which has a recessed portion and an outer flange portion, and is fixed to the detachable plate 1212 by screwing fixing screws 1222, which penetrate through the outer flange portion, in the detachable plate 1212. The fixing member 1221 presses the packing member 1216 disposed on the lower surface of the ultrasonic oscillator 122 by the bottom of the recessed portion, thus the ultrasonic oscillator 122 is fixed to the detachable plate 1212 in a watertight structure. The fixing member 1221 is provided with a through hole 1221A on the bottom of the recessed portion. A lead wire 1219 extends outward through the through hole 1221A.

FIGS. 8 and 9 are views of the atomizer 81 fixed to the atomization chamber 84. The atomization chamber 84 shown in these figures is provided with openings 813A on the bottom surface of the casing 813. The detachable plate 812 is fixed so that the openings 813A are closed in a water tight structure. The detachable plate 812 is fixed, in a watertight structure, to the casing 813 via a packing member 823. Metal fixing members 824 are fixed to the bottom surface of the casing 813 in order to fix the detachable plate 812 thereto. The metal fixing members 824 are shaped in an L-shape. Fastening screws 825, which penetrate through the fixing members 824, press and fix the detachable plate 812 to the casing 813 of the atomization chamber 84. The plurality of ultrasonic oscillators 82, which are fixed to the atomization chamber 84 in this structure, oscillate the solution upward from the bottom surface of the casing 813 to the upper surface at an ultrasonic frequency. The detachable plate 812 is detachably mounted to the bottom surface of the casing 813 of the atomization chamber 84 so as to close the openings 813A.

Figure 13:
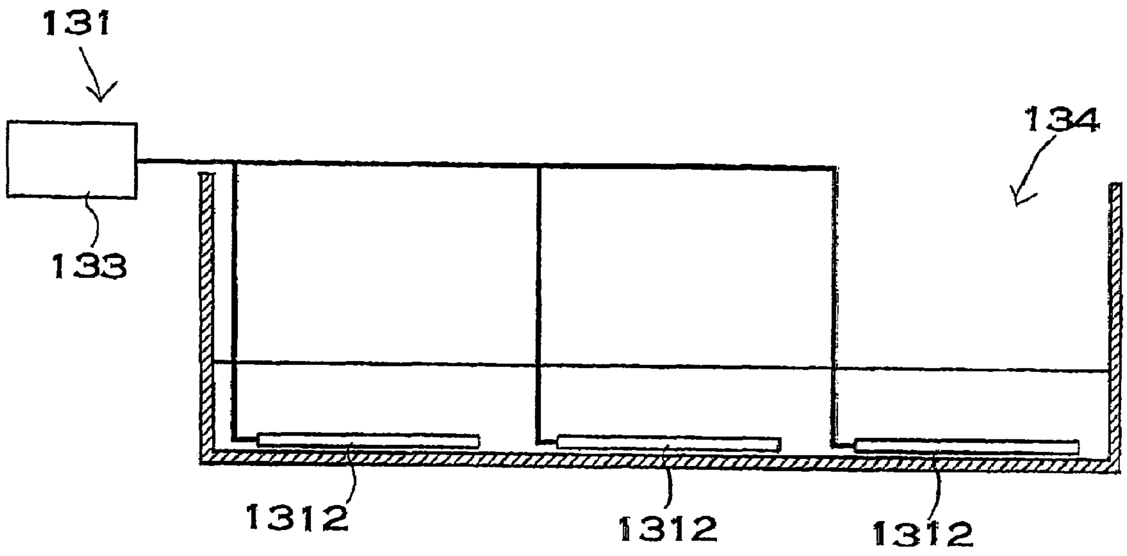
FIG. 13 is a cross-sectional view showing another example of disposing the detachable plate in the ultrasonic atomization chamber.

A detachable plate may be immersed in the solution in an atomization chamber 134 to oscillate the solution at ultrasonic frequency, as shown in FIG. 13. This structure facilitates placement of a detachable plate 1312 to the atomization chamber 134 in a detachable manner. With an atomizer 131 that is immersed in the solution, the ultrasonic oscillator is fixed in a watertight structure to the detachable plate 1312 except the oscillation surface thereof as a structure shown, for example, in FIG. 11. Here, in FIG. 13, the reference numeral 133 represents an ultrasonic power supply.

If the ultrasonic oscillator 2, 202, 302, 402 or the ultrasonic power supply 3 heats the solution in the atomization chamber 4, 204, 304, 404 to a high temperature, the quality may deteriorate. Forced cooling of the ultrasonic oscillator 2, 202, 302, 402 can solve this problem. Furthermore, the ultrasonic power supply 3, 203, 303, 403 is preferably also cooled. The ultrasonic power supply 3, 203, 303, 403 does not directly heat the solution, but heats the surroundings thereof to thereby heat the solution indirectly. The ultrasonic oscillator 2, 202, 302, 402 and the ultrasonic power supply 3 can be cooled by disposing a cooling pipe in a thermally coupled state, namely by disposing a cooling pipe in a state of being in contact. The cooling pipe cools the ultrasonic oscillator and the ultrasonic power supply by running a liquid or refrigerant, which is cooled by a cooler, or cooling water such as ground water or service water.

Figure 4:
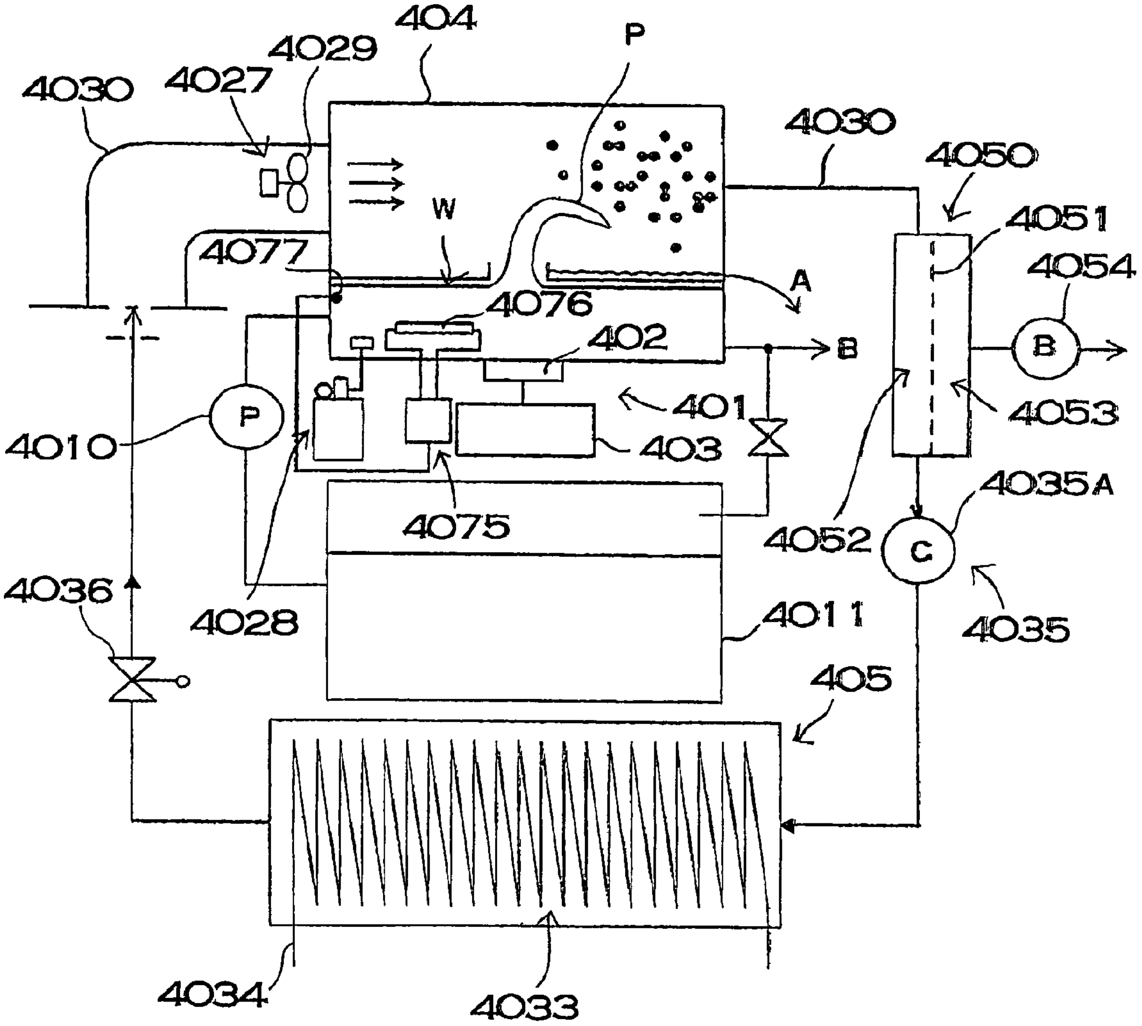
FIG. 4 is a diagram schematically showing an apparatus for concentrating a solution according to another embodiment of the present invention.

Furthermore, the separation apparatus shown in FIG. 4 includes a temperature control mechanism 4075 for controlling the temperature of the solution in the atomization chamber 404. The temperature control mechanism 4075 includes a cooler 4076 for cooling the solution so that the temperature of the solution will be a predetermined temperature. This temperature control mechanism 4075 senses the temperature of the solution stored in the atomization chamber 404 by means of a temperature sensor 4077, and controls the cooler 4076 so as to maintain the temperature of the solution to be not higher than 30° C. Thus, the separation apparatus, which controls the temperature of the solution by means of the temperature control mechanism 4075, can increase the solubility of bubbles supplied from the bubble generator 4028.

The temperature of the solution affects the efficiency In atomizing the solution into a mist by means of ultrasonic oscillation. When the temperature of the solution lowers, the efficiency in atomizing the solution into a mist decreases. When the temperature of the solution is lowered, the deterioration of the product quality will be smaller. However, if the temperature of the solution is low, the efficiency in atomizing the solution into a mist decreases, so that the temperature of the solution is set at a temperature at which the solution can be efficiently atomized into a mist while considering the property of the target substance that changes with temperature. A target substance that does not deteriorate in product quality or does not raise a problem even at a high temperature can be efficiently atomized into a mist by raising the temperature of the solution.

Figure 2:
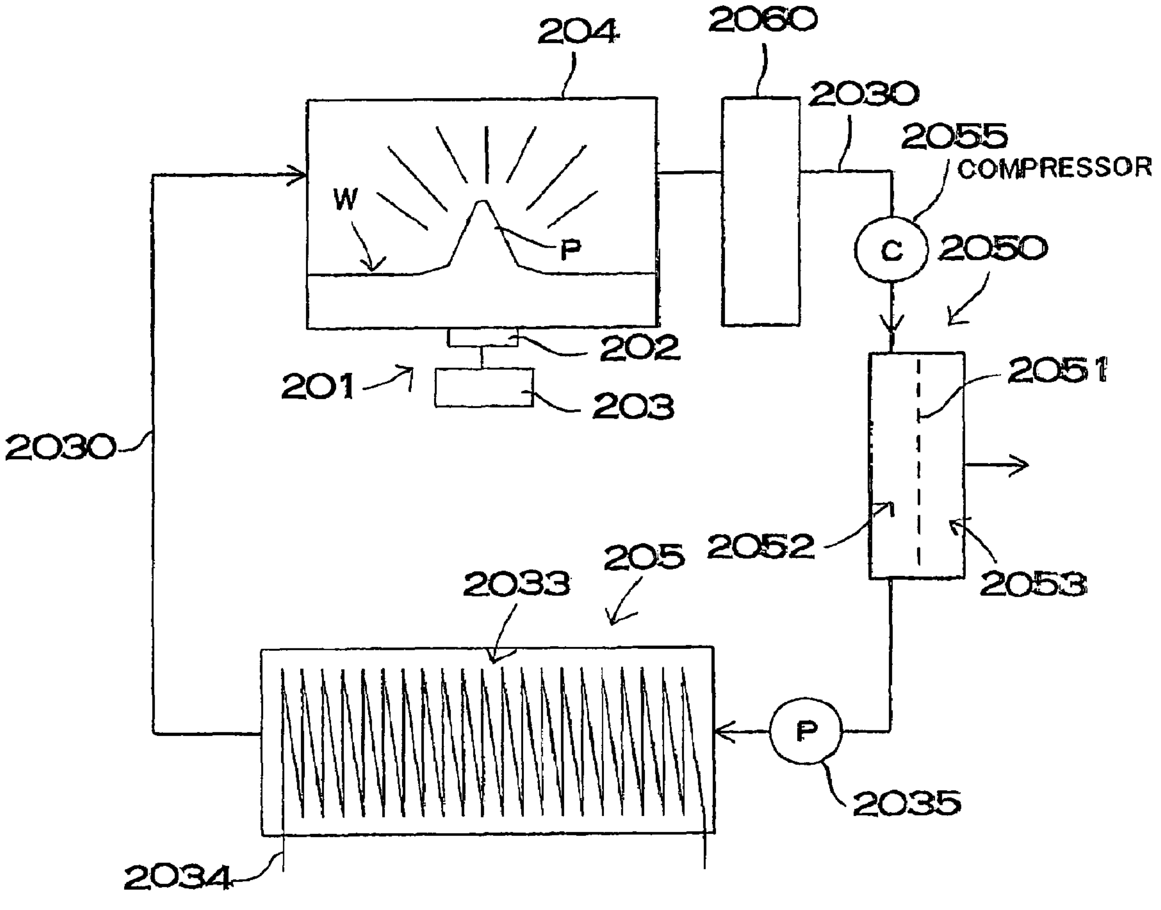
FIG. 2 is a diagram schematically showing an apparatus for concentrating a solution according to another embodiment of the present invention.
Figure 3:
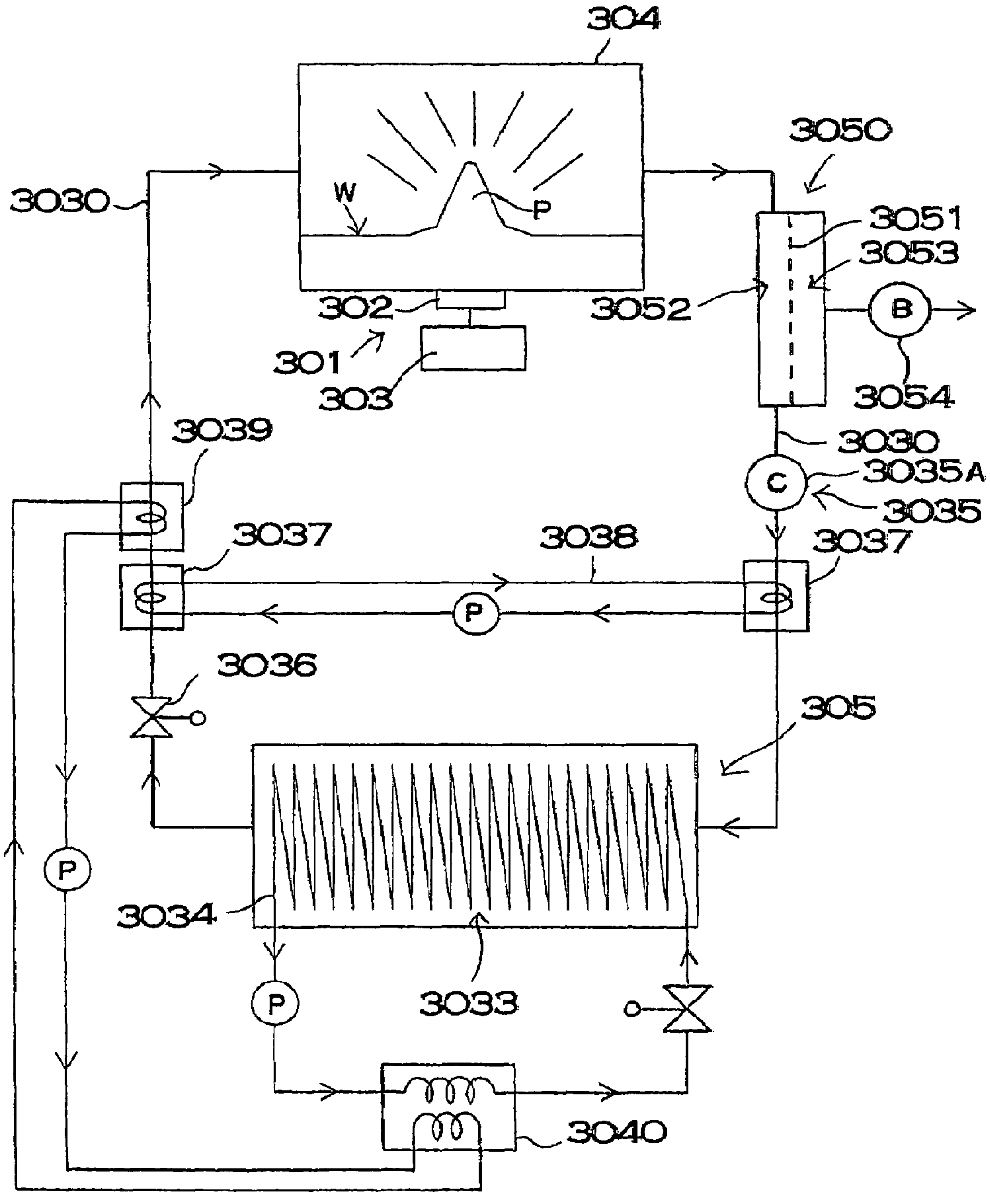
FIG. 3 is a diagram schematically showing an apparatus for concentrating a solution according to another embodiment of the present invention.

Further, with the separation apparatus shown in FIG. 4, air is blown from a blower mechanism 4027 to a liquid column P produced at the solution surface W by ultrasonic oscillation in the atomization chamber 404. The blower mechanism 4027 shown in this figure is provided with a fan 4029 for blowing air to the liquid column P. Thus, the separation apparatus that blows air to the liquid column P with the blower mechanism 4027 has an advantage in that the solution can be efficiently atomized into a mist from the surface of the liquid column P. However, the separation apparatus of the present invention need not always be provided with a blower mechanism to blow air to the liquid column, as shown in FIGS. 1 to 3.

The air separator 50, 2050, 3050, 4050 separates air from the mixed fluid supplied from the atomization chamber 4. An inside of this air separator 50, 2050, 3050, 4050 is partitioned into a primary passageway 52, 2052, 3052, 4052 and a secondary air-discharging passageway 53, 2053, 3053, 4053 with an air transmission membrane 51, 2051, 3051, 4051. The primary passageway 52, 2052, 3052, 4052 is connected to the atomizer 1, 201, 301, 401 to pass the mixed fluid. The secondary air-discharging passageway 53, 2053, 3053, 4053 discharges the air that is separated from the mixed fluid by being passed through the air transmission membrane 51, 2051, 3051, 4051.

The air transmission membrane 51, 2051, 3051, 4051 passes only air and does not pass the target substance. Therefore, this air transmission membrane 51, 2051, 3051, 4051 to be used here is a molecular sieve which is a membrane of a pore size that transmits air but does not transmit the target substance. Air is made of about 80% nitrogen and 20% oxygen. Therefore, the air transmission membrane 51, 2052, 3051, 4051 is a membrane of a pore size that transmits nitrogen and oxygen. The pore size of this air transmission membrane 51, 2051, 3051, 4051 is preferably 0.4 nm to 0.5 nm. This air transmission membrane 51, 2051, 3051, 4051 transmits the air made of nitrogen and oxygen, which are smaller than thee pore size, but does not transmit the target substance such as ethanol, which is larger than a pore size. The above air transmission membrane 51, 2051, 3051, 4051 is fabricated, for example, by coating a surface of a ceramic with zeolite.

The primary passageway 52, 2052, 3052, 4052 of the air separator 50, 2050, 3050, 4050 is connected to the atomization chamber 4, 204, 304, 404 to bring the mixed fluid into contact with the primary surface of the air transmission membrane 51, 2051, 3051, 4051. Further, with the apparatus of FIGS. 1, 3, and 4, the secondary air-discharging passageway 53, 3053, 4053 is connected to a forced air discharger 54, 3054, 4054 and, with the apparatus of FIG. 2, the primary passageway 2052 is connected to a compressor 2055, so as to make the pressure on the primary surface higher than the pressure on the secondary surface opposite thereto. Thus, the air in the mixed fluid is transmitted through the air transmission membrane 51, 2051, 3051, 4051 to separate part or all of the air in the mixed fluid.

The forced air discharger 54, 3054, 4054 is a suction pump such as a vacuum pump that sucks and discharges air in a forced manner. The suction side of the forced air discharger 54, 3054, 4054 is connected to the secondary air-discharging passageway 53, 3053, 4053 to discharge the air in the secondary air-discharging passageway 53, 3053, 4053 forcibly. The secondary air-discharging passageway 53, 3053, 4053 from which air is discharged will have a pressure lower than an atmospheric pressure, and hence will have a lower pressure than the primary passageway 52, 3052, 4052. In other words, the pressure in the primary passageway 52, 3052, 4052 will be relatively higher than the pressure in the secondary air-discharging passageway 53, 3053, 4053. When the system is brought into this state, the air contained in the mixed fluid is transmitted through the air transmission membrane 51, 3051, 4051 to pass from the primary passageway 52, 3052, 4052 to the secondary air-discharging passageway 53, 3053, 4053 to thereby be separated from the mixed fluid.

With the apparatus of FIG. 2, the compressor 2055 presses the mixed fluid into the primary passageway 2052. The suction side of the compressor 2055 is connected to the atomization chamber 204. The secondary air-discharging passageway 2053 is open to ambient atmosphere. However, a forced air discharger may be connected to the secondary air-discharging passageway to reduce the pressure of the secondary air-discharging passageway to be equal to or lower than an atmospheric pressure. The compressor 2055 pressurizes the mixed fluid to have a pressure equal to or higher than atmospheric pressure, and presses the mixed fluid into the primary passageway 2052, whereby the pressure in the primary passageway 2052 is made higher than the pressure in the secondary air-discharging passageway 2053. In this state, the air contained in the mixed fluid is transmitted through the air transmission membrane 2051 by a pressure difference between the primary surface and the secondary surface. The air transmitted through the air transmission membrane 2051 is transported from the primary passageway 2052 to the secondary air-discharging passageway 2053 to thereby be separated from the mixed fluid. This structure can increase the pressure difference between the primary surface and the secondary surface of the air transmission membrane 2051. For this reason, the air in the mixed fluid can be speedily separated. The reason is that the compressor 2055 can press the mixed fluid into the primary passageway 2052 by a high pressure.

Further, with the apparatus of FIG. 2, the suction side of the compressor 2055 is connected to the atomization chamber 204 via a previous-stage collection chamber 2060. With the separation apparatus, any one of a cyclone, a punched plate, a demistor, a chevron, a scrubber, a spray tower, and an electrostatic collector can be connected as the previous-stage collection chamber 2060 to collect the mist. With the separation apparatus of FIG. 2 the mechanism such as these is disposed between the air separator 2050 and the atomization chamber 204 to serve as the previous-stage collection chamber 2060. With this apparatus, the mixed fluid from which part of the mist has been collected in the previous-stage collection chamber 2060 is supplied to the air separator 2050. However, with the separation apparatus, any one of a cyclone, a punched plate, a demistor, a chevron, a scrubber, a spray tower, and an electrostatic collector can be connected between the air separator and the collection chamber to collect the mist, though not illustrated in the drawings.

The air separated by the air separator 50, 2050, 3050, 4050 is an air that does not contain the target substance. With the apparatus of FIG. 1, the air separated by the air separator 50 is supplied to the atomization chamber 4. With the apparatus in which the air separated by the air separator 50 is supplied to the atomization chamber 4, the mist can be produced efficiently by atomization in the atomization chamber 4. The reason is that the air separated from the mixed fluid by the air separator 50 does not contain the target substance. Also, since the air separated by the air separator 50 is air that is controlled to have an optimum temperature for producing the mist in the atomization chamber 4, the mist can be efficiently produced by supplying this air into the atomization chamber 4.

The mixed fluid from which air has been separated by the air separator 50, 2050, 3050, 4050 has a smaller content of air, namely, has a larger content of the mist relative to air, so that the target substance of the mist will be in a supersaturated state. Therefore, the mist can be collected efficiently in the collection chamber 5, 205, 305, 405. Since air is separated from the mixed fluid by the air separator 50, 2050, 3050, 4050, the mixed fluid supplied to the collection chamber 5, 205, 305, 405 has a smaller content of air than the mixed fluid discharged from the atomization chamber 4, 204, 304, 404.

The mixed fluid from which part of the air has been separated by the air separator 50, 2050, 3050, 4050 is transported to the collection chamber 5, 205, 305, 405. The mixed fluid is supplied to the collection chamber 5, 205. 305, 405 by a forced transporter 35, 2035, 3035, 4035 made of a blower or a compressor. The forced transporter 35, 2035, 3035, 4035 is connected between the air separator 50, 2050, 3050, 4050 and the collection chamber 5, 205, 305, 405 so as to supply the mixed fluid from the air separator 50, 2050, 3050, 4050 to the collection chamber 5, 205, 305, 405. The forced transporter 35, 2035, 3035, 4035 absorbs the mixed fluid from which part of the air has been separated by the air separator 50, 2050, 3050, 4050, and supplies the absorbed mixed fluid to the collection chamber 5, 205, 305, 405.

With the apparatus shown in FIGS. 3 and 4, a compressor 3035A. 4035A is used as the forced transporter 3035, 4035. When the compressor 3035A, 4035A is used as the forced transporter 3035, 4035, the mixed fluid can be supplied to the collection chamber 305, 405 by being pressurized to have a pressure higher than an atmospheric pressure. With this separation apparatus, in the collection chamber 305, 405, the saturation vapor partial pressure of the target substance in gas phase is made lower than the saturation vapor partial pressure thereof under atmospheric pressure whereby the mist can be aggregated and collected more effectively.

The compressor 3035A, 4035A to be used may be a compressor of a piston type, a compressor of a rotary type, a compressor of a diaphragm type, a compressor of a Rischorm type, or the like. The compressor 3035A, 4035A to be used is preferably of a type that can transport the mixed fluid by pressurizing the mixed fluid to 0.2 to 1 MPa.

With the apparatus that increases the pressure in the collection chamber 305, 405 by using the compressor 3035A, 4035A as the forced transporter 3035, 4035, a throttle valve 3036, 4036 is connected to an outlet side of the collection chamber 305, 405. However, if the flow rate of the mixed fluid supplied to the collection chamber by the compressor is high, the throttle valve need not always be provided on the outlet side of the collection chamber. The reason is that, if the passage resistance on the outlet side of the collection chamber is large, the compressor can supply a large amount of the mixed fluid to the collection chamber to increase the pressure in the collection chamber to be higher than an atmospheric pressure. However, when the throttle valve is connected to the outlet side of the collection chamber, the pressure in the collection chamber can be efficiently increased to be higher than an atmospheric pressure. The throttle valve 3036, 4036 increases the pressure in the collection chamber 305, 405 by increasing the passage resistance of the mixed fluid discharged from the collection chamber 305, 405. The throttle valve 3036, 4036 to be used may be a valve that can adjust the passage resistance of the mixed fluid by adjusting the degree of opening, a pipe made of a narrow pipe such as a capillary tube to increase the passage resistance of the mixed fluid, or a pipe filled with a resisting material that increases the passage resistance of the mixed fluid, or the like. According as the throttle valve 3036, 4036 makes the passage resistance larger, the pressure in the collection chamber 305, 405 will be higher.

Figure 14:
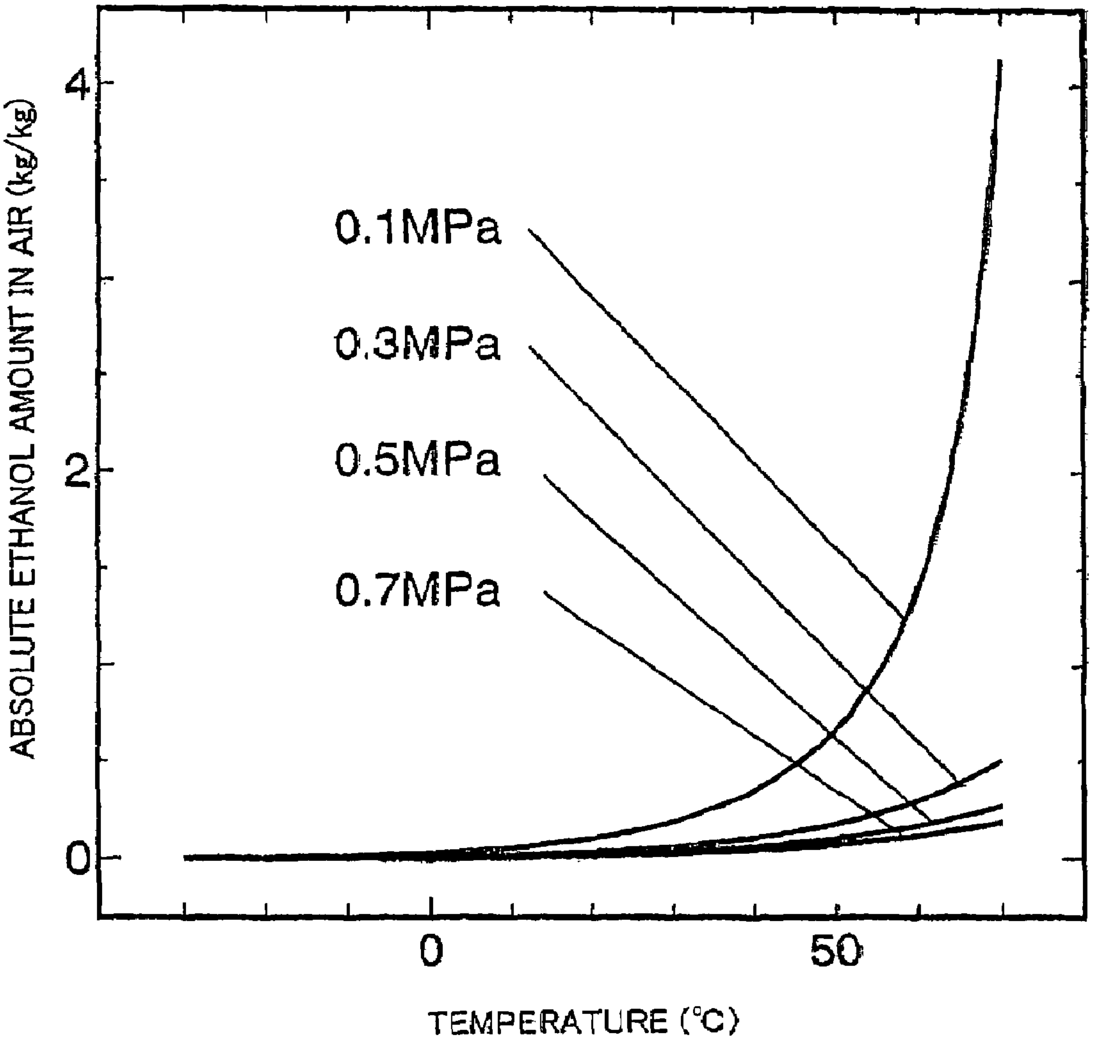
FIG. 14 is a graph showing an absolute ethanol amount in air under pressure.

FIG. 14 shows a state in which the amount of ethanol of the target substance contained in air, which is a mixed fluid, decreases as the pressure in the collection chamber is increased so as to be higher than an atmospheric pressure. As will be understood from this graph, the air of the mixed fluid can contain a larger amount of ethanol in a gas state as the temperature becomes higher. However, when the pressure becomes higher, the amount of ethanol that can be contained in a gas state rapidly decreases. For example, at a temperature of 30° C., the amount of ethanol tat can be contained in dry air considerably decreases to about ⅕ when the pressure is raised from 0.1 MPa, which is an atmospheric pressure, to 0.5 MPa. When the maximum amount of ethanol that can be contained in a gas state decreases, a larger amount of ethanol than the maximum amount of ethanol will all be in a state of a supersaturated mist, and can be efficiently collected. The ethanol contained in a gas state cannot be aggregated and collected unless turned into a mist. Also, even if ultrasonic oscillation atomizes the target substance into a mist state, the target substance cannot be aggregated and collected if the mist vaporizes into a gas state. For this reason, it is important to collect the target substance, which has been turned into a mist by ultrasonic oscillation, in a mist state without vaporizing the mist. Also, even if the mist vaporizes, the mist can be liquefied again in a supersaturated state and collected. Namely, in order to collect the target substance efficiently, it is important that the target substance once turned into a mist is vaporized into the mixed fluid in an amount as little as possible. The present invention increases the pressure of the mixed fluid containing the mist to be higher than an atmospheric pressure to reduce the saturation vapor partial pressure of the target substance, thereby efficiently collecting the target substance contained in the mixed fluid not in a gas state but in a mist state. The saturation vapor partial pressure can be reduced by cooling the mixed fluid; however, the pressuring method has a characteristic such that the compressor can lower the saturation vapor partial pressure efficiently and extremely easily with low energy consumption. Further, pressurizing while cooling can further reduce the saturation vapor partial pressure of the target substance, whereby the target substance can be collected more efficiently.

When the compressor 3035A, 4035A compresses the mixed fluid, the mixed fluid undergoes adiabatic compression to generate heat. Also, when the mixed fluid passes through the throttle valve 3036, 4036, the mixed fluid undergoes adiabatic expansion to be cooled. The mixed fluid supplied from the compressor 3035A. 4035A to the collection chamber 305, 405 is preferably cooled so as to collect the mist efficiently. Therefore, when heat is generated, the collection efficiency will be poor. In order to reduce this problem, the apparatus shown in FIG. 3 is provided with a heat-discharging heat exchanger 3037 for exchanging heat between a portion on an outlet side of the throttle valve 3036 and a portion on an outlet side of the compressor 3035A and on an inlet side of the collection chamber 305. With the mixed fluid cooled by adiabatic expansion on the outlet side of the throttle valve 3036, the heat-discharging heat exchanger 3037 cools the mixed fluid heated through adiabatic compression by the compressor 3035A.

The heat-discharging heat exchanger 3037 circulates a refrigerant in the inside of a circulation pipe 3038. One end of the circulation pipe 3038 is thermally coupled to the outlet side of the throttle valve 3036, and the other end of the circulation pipe 3038 is thermally coupled to the outlet side of the compressor 3035A. The refrigerant that circulates in the circulation pipe 3038 is cooled on the outlet side of the throttle valve 3036. The refrigerant cooled here cools the outlet side of the compressor 3035A. Though not illustrated in the drawings, the part of the circulation pipe 3038 that is thermally coupled has a double-pipe structure so as to achieve thermal coupling between the mixed fluid and the refrigerant.

Further, the apparatus shown in FIG. 3 is provided with a second heat-discharging heat exchanger 3039 that connects the outlet side of the throttle valve 3036 to a condenser 3040 that cools the cooling heat exchanger 3033. This second heat-discharging heat exchanger 3039 has the same structure as the aforesaid heat-discharging heat exchanger 3037, and cools the refrigerant on the outlet side of the throttle valve 3036. The cooled refrigerant cools the condenser 3040 to liquefy the refrigerant that circulates in the inside of the condenser 3040.

With the apparatus shown in FIGS. 2 to 4, the atomization chamber 204, 304, 404, the air separator 2050, 3050, 4050, and the collection chamber 205, 305, 405 are connected with a circulation duct 2030, 3030, 4030 so as to circulate the mixed fluid through the atomization chamber 204, 304, 404 and the collection chamber 205, 305, 405. With the apparatus of FIG. 1, the outlet side of the atomization chamber 4, the air separator 50, and the inlet side of the collection chamber 5 are connected with the circulation duct 30; however, the outlet side of the collection chamber 5 and the inlet side of the atomization chamber 4 are not connected with a circulation duct. With this apparatus, the air separated by the air separator 50 is circulated into the atomization chamber 4.

The collection chamber 5, 205, 305, 405 shown in FIGS. 1 to 4 incorporates a cooling heat exchanger 33, 2033, 3033, 4033 for cooling and aggregating the mist. In the cooling heat exchanger 33, 2033, 3033, 4033, a fin (not illustrated) is fixed to the heat exchange pipe 34, 2034, 3034, 4034. By circulating a refrigerant for cooling or cooling water in the heat exchange pipe 34, 2034, 3034, 4034, the cooling heat exchanger 33, 2033, 3033, 4033 is cooled. Part of the mist atomized in the atomization chamber 4, 204, 304, 404 is vaporized into gas. The gas is cooled by the cooling heat exchanger 33, 2033, 3033, 4033 of the collection chamber 5, 205, 305, 405 and is condensed and aggregated to be collected. The mist that flows into the collection chamber 5, 205, 305, 405 collides with the cooling heat exchanger 33, 2033, 3033, 4033, or collides with each other to form a large aggregation, or collides with the fin or the like of the cooling heat exchanger 33, 2033, 3033, 4033 to form a large aggregation to be collected as a solution. The air from which the mist and the gas are aggregated and collected by the cooling heat exchanger 33, 2033, 3033, 4033 is circulated again to the atomization chamber 4, 204, 304, 404 via the circulation duct 30, 2030, 3030, 4030.

Figure 15:
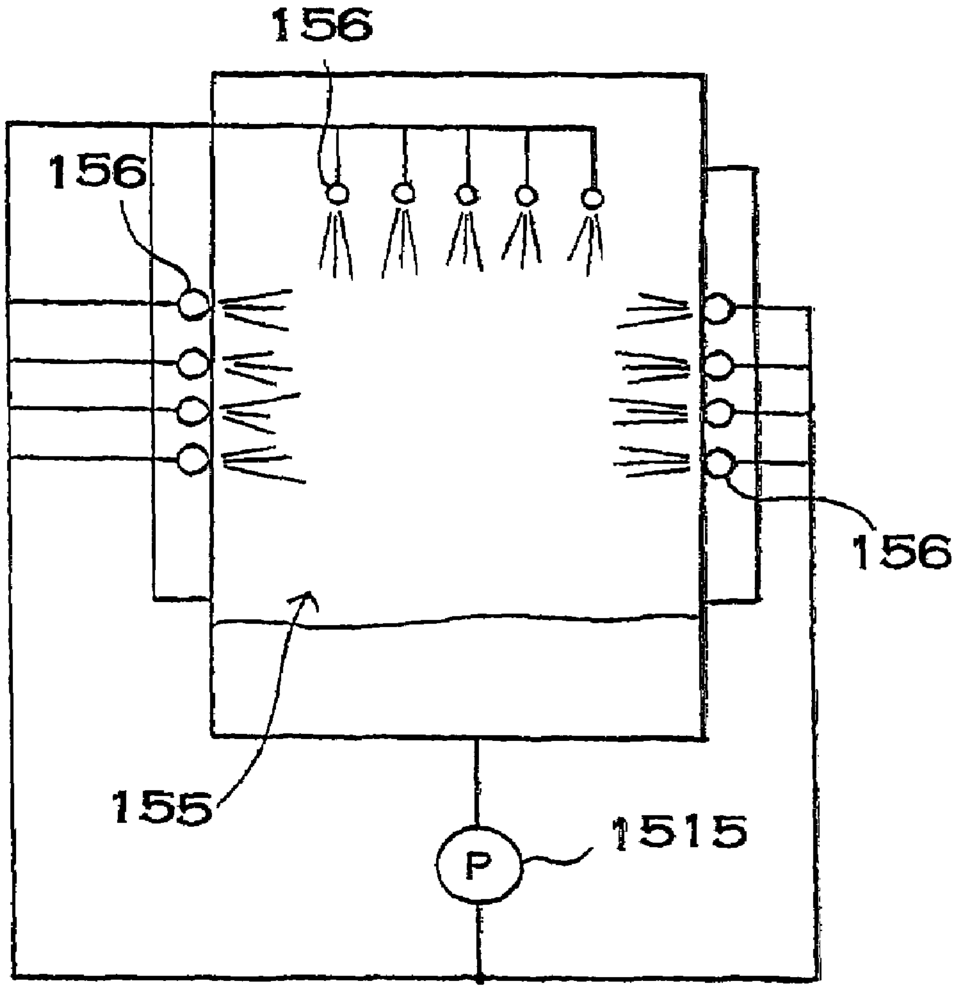
FIG. 15 is a cross-sectional view schematically showing one example of a collection chamber.

In order to collect the mist more speedily in the collection chamber, the collection chamber 155 in FIG. 15 is provided with nozzles 156 that scatter the solution. The nozzles 156 are connected to the bottom portion of the collection chamber 155 via a circulation pump 1515. The circulation pump 1515 sucks the solution collected in the collection chamber 155 and sprays the sucked solution through the nozzles 156.

With the separation apparatus shown in FIG. 15, the nozzles 156 are disposed in the upper part of the collection chamber 155. The nozzles 156 in the upper part spray the solution downwards. The solution sprayed through the nozzles 156 is made of water droplets that are sufficiently larger than the droplets of the mist atomized by the atomizer, and fall down speedily in the inside of the collection chamber 155. When falling down, the water droplets collide with the mist that is floating in the inside of the collection chamber 155, and fall down while collecting the mist. Therefore, the mist floating in the collection chamber 155 can be collected speedily and efficiently.

With the separation apparatus shown in FIG. 15, the nozzles 156 are disposed in the upper part; however, the nozzles can be disposed in the lower part of the collection chamber. The nozzles in the lower part spray the solution upwards. These nozzles spray the solution at a speed that makes the solution collide with the ceiling of the collection chamber or at a speed that lifts the solution up to a neighborhood of the ceiling. The solution that is sprayed to be lifted up to the neighborhood of the ceiling changes its direction downwards at the neighborhood of the ceiling and falls. Therefore, the sprayed solution gets in contact with the mist when rising and falling, thereby efficiently collecting the mist.

Figure 16:
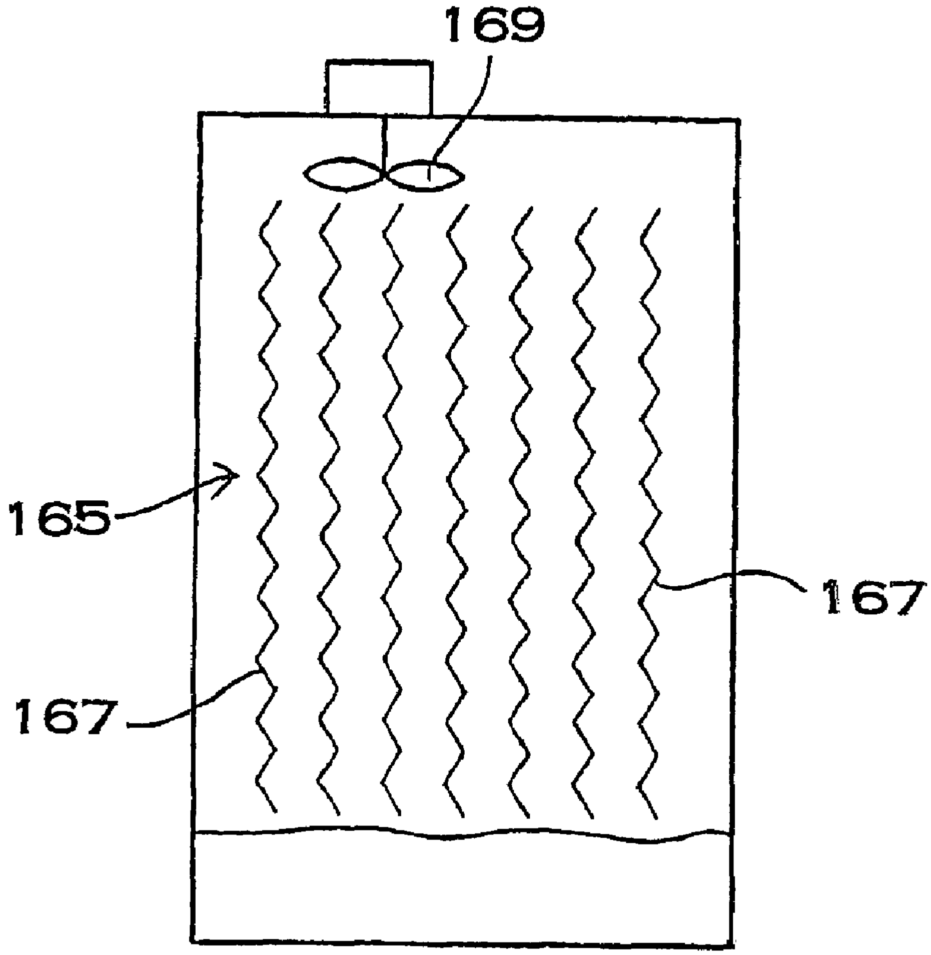
FIG. 16 is a cross-sectional view schematically showing another example of a collection chamber.

Plural sheets of baffle plates 167 are provided in the inside of the collection chamber 165 of FIG. 16. Each baffle plate. 167 is spaced apart from adjacent baffle plates 167 with a gap through which the mist can pass, and is disposed in a vertical posture. The mist collides with the surface of the baffle plates 167 to produce a solution, and the vertical baffle plates 167 can let the adhering solution flow down in a natural manner to be collected. The baffle plates 167 in FIG. 16 have an uneven surface, whereby the mist comes into contact more efficiently with the surface to be collected.

Furthermore, a fan 169, which blows and stirs the mist in a forced manner, is provided in the collection chamber 165 of FIG. 16. The fan 169 stirs the mist in the collection chamber 165. The droplets of the stirred mist collide with each other and aggregate, or collide with the surface of the baffle plates 167 and aggregate. The aggregated mist quickly falls down and is collected. The fan 169 in FIG. 16 blows the mist of the collection chamber 165 downwards for circulation.

Figure 17:
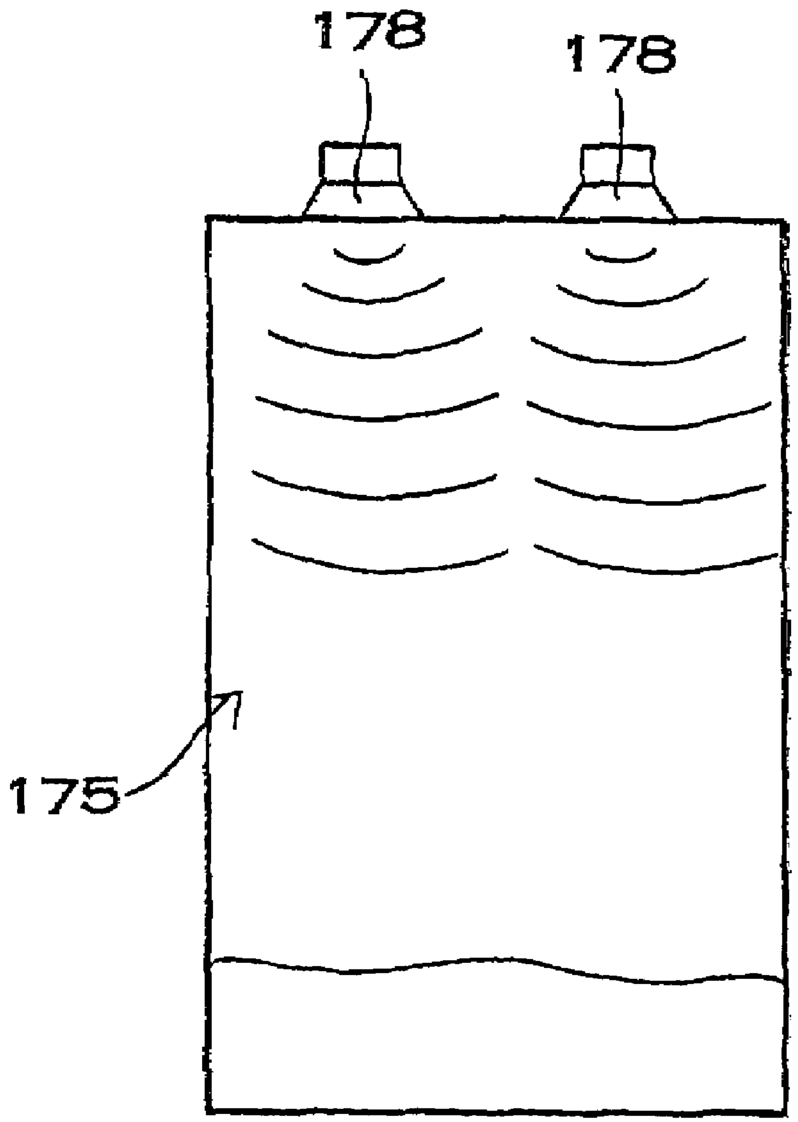
FIG. 17 is a cross-sectional view schematically showing another example of a collection chamber.

Furthermore, a mist oscillator 178 for oscillating the mist to increase the probability of collision with each other is provided in the collection chamber 175 of FIG. 17. The mist oscillator 178 includes an electrical-to-mechanical oscillation converter, which oscillates the gas of the collection chamber 175, and an oscillation power supply that drives the electrical-to-mechanical oscillation converter. The electrical-to-mechanical oscillation converter is a speaker for emitting a sound at an audible frequency, an ultrasonic oscillator for emitting ultrasonic waves having a frequency higher than an audible frequency, or the like. In order that the electrical-to-mechanical oscillation converter may efficiently oscillate the mist, the oscillation emitted from the electrical-to-mechanical oscillation converter is resonated in the collection chamber 175. In order to achieve this resonation, the electrical-to-mechanical oscillation converter oscillates the mist at the frequency that resonates in the collection chamber 175. In other words, the collection chamber 175 is designed to have a shape that is resonated with the oscillation emitted from the electrical-to-mechanical oscillation converter.

Ultrasonic waves involve high frequencies above the audible frequency of human beings and are inaudible to the human ear. For this reason, with the mist oscillator 178 emitting ultrasonic waves, even if the gas in the collection chamber 175 is intensely oscillated, in other words, even if the output power of the electrical-to-mechanical oscillation converter is very high, the mist oscillator will not harm human beings due to sound. Therefore, ultrasonic waves have an advantage in that the mist can be intensely oscillated, and the droplets of the mist arc made to collide with each other efficiently to be quickly collected.

With the separation apparatus described above, a device that aggregates the mist efficiently is disposed in the collection chamber, so that the mist can be aggregated more speedily to prepare a solution having a high concentration. Further, though not illustrated, the separation apparatus of the present invention may incorporate in the collection chamber all of the nozzles that spray the solution, the fan that stirs the mist, and the oscillator that oscillates the mist to aggregate the mist most efficiently. Also, two devices that aggregate the mist may be incorporated to aggregate the mist efficiently.

The atomization chamber 4, 204, 304, 404 and the collection chamber 5, 205, 305, 405 are preferably filled with an inert gas. With this apparatus, the inert gas prevents deterioration of the quality of the solution in the atomization chamber 4, 204, 304, 404 and the collection chamber 5, 205, 305, 405. For this reason, a solution having a high concentration can be obtained in a state having a higher product quality.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

This application is based on applications No.2004-097781 filed in Japan on Mar. 30, 2004, the content of which is incorporated hereinto by reference.

What is claimed is:

1. A method of separating a solution, the method comprising:

atomizing a solution containing a target substance into a mist in an atomizer to produce a mixed fluid of mist and air;

separating air from the mixed fluid by bringing the mixed fluid into contact with a primary surface of an air transmission membrane contained in an air separator, wherein the air transmission membrane has pores sized to transmit air but not the target substance contained in the mist, wherein a pressure on the primary surface of the air transmission membrane is made higher than a pressure on a secondary surface of an opposite side of the air transmission membrane so that the air in the mixed fluid passes through the air transmission membrane to separate part or all of the air contained in the mixed fluid; and collecting the mist from the mixed fluid from which at least part of the air has been separated by the air transmission membrane, wherein the mist is collected by aggregating and collecting the mist in a collection chamber connected to an outlet side of a primary passageway provided in the air separator, and wherein the mist is aggregated and collected by cooling the mixed fluid with a cooling heat exchanger provided in the collection chamber.

2. The method of separating a solution according to claim 1, wherein the atomizer atomizes the solution into the mist by ultrasonic oscillation.

3. The method of separating a solution according to claim 2, wherein the atomizer atomizes the solution into the mist by ultrasonic oscillation at a frequency of 1 MHz or higher.

4. The method of separating a solution according to claim 1, wherein the mixed fluid, from which the mist has been separated by cooling and aggregation after part of the air is separated by the air transmission membrane, is circulated and supplied to the atomizer.

5. The method of separating a solution according to claim 1, wherein the air separated from the mixed fluid by the air transmission membrane is supplied to the atomizer.

6. The method of separating a solution according to claim 1, wherein the solution containing the target substance is any one of refined sake, beer, wine, vinegar, mirin (sweet sake for cooking), spirits, shochu (Japanese spirits), brandy, whisky, and liqueur.

7. The method of separating a solution according to claim 1, wherein the solution containing the target substance is a solution containing a perfume, an aromatic component, or a fragrant component.

8. The method of separating a solution according to claim 1, wherein the solution containing the target substance is a solution containing an organic compound that is classified as any one of alkane and cycloalkane, which are a saturated hydrocarbon, alkene, cycloalkene, and alkyne, which are an unsaturated hydrocarbon, ether, thioether, and aromatic hydrocarbon, or a compound obtained by bonding these.

9. The method of separating a solution according to claim 1, wherein the solution containing the target substance is a solution containing a substance obtained by substituting a halogen(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

10. The method of separating a solution according to claim 1, wherein the solution containing the target substance is a solution containing a substance obtained by substituting a hydroxy group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

11. The method of separating a solution according to claim 1, wherein the solution containing the target substance is a solution containing a substance obtained by substituting an amino group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

12. The method of separating a solution according to claim 1, wherein the solution containing the target substance is a solution containing a substance obtained by substituting a carbonyl group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

13. The method of separating a solution according to claim 1, wherein the solution containing the target substance is a solution containing a substance obtained by substituting a carboxyl group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

14. The method of separating a solution according to claim 1, wherein the solution containing the target substance is a solution containing a substance obtained by substituting a nitro group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

15. The method of separating a solution according to claim 1, wherein the solution containing the target substance is a solution containing a substance obtained by substituting a cyano group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

16. The method of separating a solution according to claim 1, wherein the solution containing the target substance is a solution containing a substance obtained by substituting a mercapto group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

17. An apparatus for separating a solution, the apparatus comprising:

an atomization chamber for receiving a solution containing a target substance;

an atomizer for scattering the solution in the atomization chamber into air as a mist to produce a mixed fluid of air and the mist of the solution; and an air separator, connected to the atomization chamber, for separating air from the mixed fluid, the air separator having an interior that is partitioned by an air transmission membrane to provide a primary passageway for passing the mixed fluid and a secondary air-discharge passageway for discharging air, the air separator having a pore size that allows transmission of air but not transmission of the target substance; and a forced air discharger connected to the secondary air discharge passageway of the air separator, the forced air discharger being operable to discharge the air in the secondary air-discharge passageway in a forced manner to make a pressure on a primary surface of the air transmission membrane higher than a pressure on a secondary surface of the air transmission membrane so that the air contained in the mixed fluid may be transmitted through the air transmission membrane to separate air from the mixed fluid that passes through the primary passageway;

a collection chamber connected to an outlet side of the primary passageway provided in the air separator; and a cooling heat exchanger provided in the collection chamber, wherein the mist from the mixed fluid can be aggregated and collected by cooling the mixed fluid with the cooling heat exchanger.

18. The apparatus for separating a solution according to claim 17, wherein the air transmission membrane includes a filter member obtained by coating a surface of a ceramic with zeolite.

19. The apparatus for separating a solution according to claim 17, wherein the atomizer includes an ultrasonic oscillator for atomizing the solution into a mist by ultrasonic oscillation and an ultrasonic power supply connected to the ultrasonic oscillator to supply high-frequency electric power to the ultrasonic oscillator for ultrasonic oscillation.

20. The apparatus for separating a solution according to claim 17, wherein the mist is collected by connecting any one of a cyclone, a punched plate, a demistor, a chevron, a scrubber, a spray tower, and an electrostatic collector to an outlet side or an inlet side of the air separator.

21. The apparatus for separating a solution according to claim 17, wherein a collection chamber is connected to the atomization chamber, whereby the air from which air has been separated by the air separator and further the mist has been separated in the collection chamber is supplied to the atomization chamber.

22. The apparatus for separating a solution according to claim 17, wherein the secondary air-discharging passageway of the air separator is connected to the atomization chamber, whereby the air separated from the mixed fluid by the air transmission membrane of the air separator is supplied to the atomization chamber.

23. An apparatus for separating a solution, the apparatus comprising:

an atomization chamber for receiving a solution containing a target substance;

an atomizer for scattering the solution in the atomization chamber into air as a mist to produce a mixed fluid of aft and the mist of the solution;

an air separator, connected to the atomization chamber, for separating air from the mixed fluid, the air separator having an interior that is partitioned by an air transmission membrane to provide a primary passageway for passing the mixed fluid and a secondary air-discharge passageway for discharging air, the air separator having a pore size that allows transmission of air but not transmission of the target substance;

a compressor for pressurizing and supplying the mixed fluid to the air separator, the compressor being connected to the primary passageway of the air separator to supply the mixed fluid into the primary passageway to make a pressure on a primary surface of the air transmission membrane higher than a pressure on a secondary surface of the air transmission membrane so that the air contained in the mixed fluid may be transmitted through the air transmission membrane to separate at least part of the air from the mixed fluid that passes through the primary passageway;

a collection chamber connected to an outlet side of the primary passageway provided in the air separator; and a cooling heat exchanger provided in the collection chamber, wherein the mist from the mixed fluid can be aggregated and collected by cooling the mixed fluid with the cooling heat exchanger.

* * * * *